Oct. 23, 1956 D. W. MORRIS 2,768,033
CRANKSHAFT AND MAIN BEARING ASSEMBLY
Filed Feb. 23, 1954 3 Sheets-Sheet 1
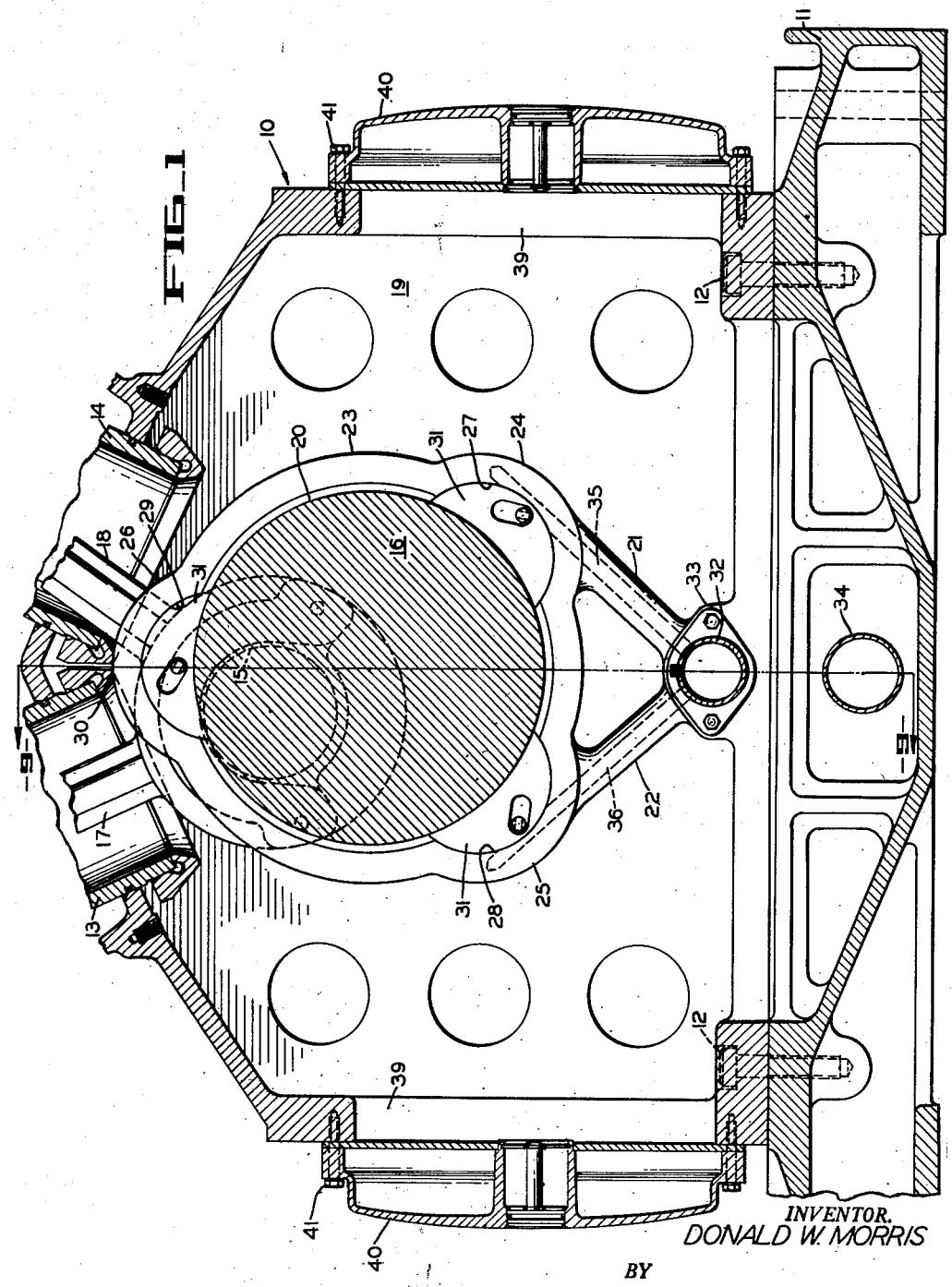
INVENTOR.
DONALD W. MORRIS
BY
Mellin and Hanscom
ATTORNEYS Oct. 23, 1956   D. W. MORRIS   2,768,033
CRANKSHAFT AND MAIN BEARING ASSEMBLY
Filed Feb. 23, 1954   3 Sheets-Sheet 2
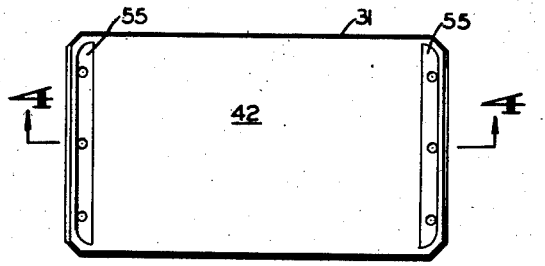
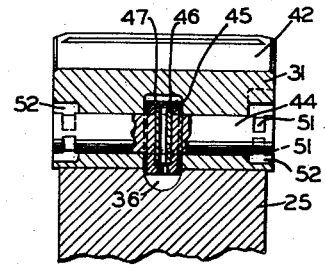
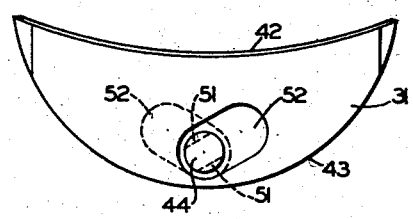
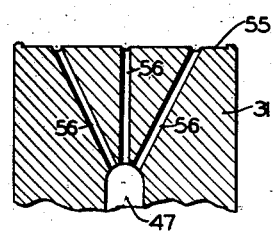
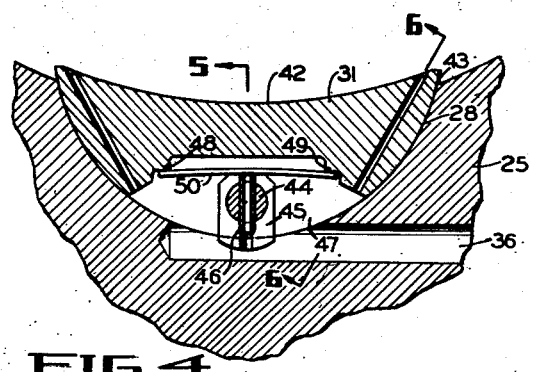
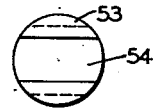
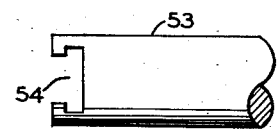
INVENTOR.
DONALD W. MORRIS
BY
Mellin and Hanscom
ATTORNEYS

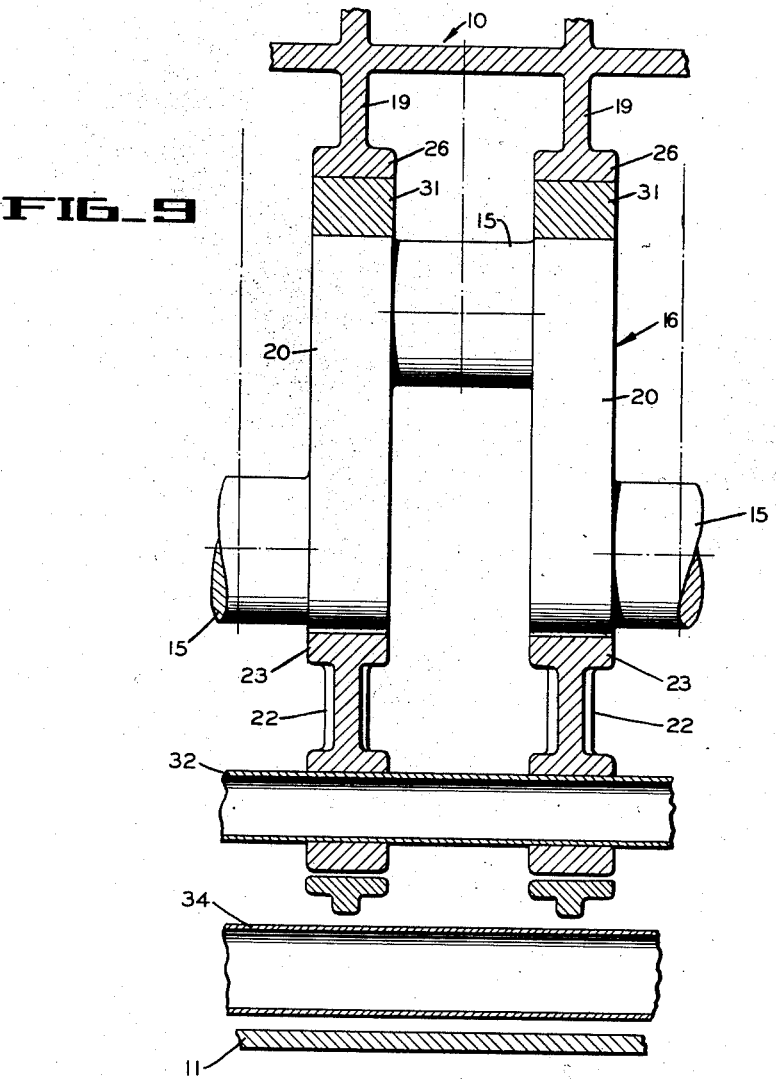

2,768,033

CRANKSHAFT AND MAIN BEARING ASSEMBLY

Donald W. Morris, Berkeley, Calif., assignor to Morris Development Company, Los Angeles, Calif., a copartnership Application February 23, 1954, Serial No. 411,769

6 Claims. (Cl. 308—73)

This application relates to an internal combustion engine and, more particularly, to the main bearing and crankshaft assembly for such an engine.

The invention is described with reference to an engine of the V type, but the principles of the invention are equally applicable to "diamond" or other types of engines.

The principal object of this invention is to provide an internal combustion engine having a crankshaft supported by a plurality of removable bearing pads, each of which contacts only a portion of the crankshaft bearing surface with which it cooperates.

A further object of this invention is to provide an engine of the type set forth above wherein each of the bearing pads may be selectively inspected or replaced without disturbing the other elements of the engine.

A still further object of this invention is to provide an engine wherein the crankshaft may be removed longitudinally of the engine by removing the main bearing pads without removing the engine from its foundation, or any major disassembly of the engine.

Another object of this invention is to provide an engine of the type specified wherein it is impossible to remove the tool used for installing the individual bearing pads except when the bearing pad is properly locked in place.

Various other objects of the present invention will be apparent from the following description taken in connection with the accompanying drawings, wherein:

Fig. 1 is a partial transverse sectional view of an engine embodying the principles of my invention.

Fig. 2 is a plan view of one of the bearing pads.

Fig. 3 is an elevational view of the bearing pad shown in Fig. 2.

Fig. 4 is a section taken on line 4—4 of Fig. 2.

Fig. 5 is a section taken on line 5—5 of Fig. 4.

Fig. 6 is a section taken on line 6—6 of Fig. 4.

Fig. 7 is an end view of the installing tool used to install the bearing pads.

Fig. 8 is a partial side view of the installing tool.

Fig. 9 is a partial sectional view taken on line 9—9 of Fig. 1.

Referring now to the drawings, wherein similar reference numerals are used to designate similar elements throughout the various views, the engine comprises an engine block generally indicated at 10, resting on a bed 11 and fastened thereto by bolts 12. (Only the lower crank housing portion of the block is shown.) The engine has the usual cylinders, shown at 13 and 14, having reciprocally mounted therein pistons (not shown) connected to a crankpin journal 15 on the crankshaft 16, by connecting rods 17 and 18. The engine is equipped with the conventional means (not shown) for introducing air and fuel vapor to the cylinders. All of these elements are conventional engine structure and form no part of the instant invention.

As best seen in Fig. 9, a main bearing supporting web 19 extends transversely of the block 10 intermediate the cylinders and on the centerline of each main bearing surface 20. Said web 19 is either cast integral with the block 10 or is welded thereto. Each web 19 is provided with a large central aperture defined by a generally circular bearing supporting flange 23 extending perpendicularly outward from each face of the web 19. The bearing supporting flange 23 is generally circular but has three projecting portions 24, 25 and 26 extending outwardly therefrom. The projecting portions 24, 25 and 26 have formed therein internal arcuate recesses 27, 28 and 29, respectively. A crescent-shaped bearing pad 31 is mounted in each of said recesses and engages the bearing surface 20 of the crankshaft, all of the bearing pads throughout the engine being identical. The projecting portion 24 and the bearing pad associated therewith are located so as to be approximately opposed to the maximum thrust of cylinder 13 and similarly the projecting portion 25 and the bearing pad associated therewith are located so as to be approximately opposed to the maximum thrust of cylinder 14.

A boss 33 is formed on the lower central portion of each web 19 and a longitudinally extending oil pressure header 32 extends through said bosses. Two thickened portions 21 and 22 are provided on each of the webs 19 which constitute ribs connecting the projections 24 and 25, respectively, with each of the bosses 33. Passages 35 and 36 drilled in the ribs 21 and 22, respectively connect the pressure header 32 with the arcuate recesses 27 and 28, respectively. A suction scavenger header 34 is mounted in a suitable manner (not shown) in the lower portion of the block 10.

The upper central bearing pad is not lubricated under pressure and is lubricated only by the carryover from the pads in recesses 24 and 25.

Referring now to Figs. 2 to 6, inclusive, particularly Fig. 4 wherein the bearing pad associated with arcuate recess 28 is disclosed in detail, it may be seen that the bearing pad 31 is crescent-shaped having a concave front surface 42 of the same curvature as the bearing surface 20 on the crankshaft and a convex rear surface of the same curvature as the arcuate recesses 28 in the projecting portion 25 of the bearing support ring 23. It may further be seen that the oil passageway 36 partially intersects the bottom of recess 28, providing a slot in the bottom of said recess.

As best seen in Fig. 5 the bearing pad 31 has a cylindrical pin 44 mounted therein, said pin extending transversely of the pad. A collar 45 generally rectangular in cross section is mounted on the central portion of the pin 44 and is prevented from turning relative thereto by a key 46. The collar 45 is positioned in a longitudinally extending generally arcuate-shaped groove 47 provided in the rear surface 43 of the bearing pad. The groove 47 has two downwardly facing shoulders 48 and 49, one on either side of the collar 45. A leaf spring 50 is mounted in said groove 47 with its ends bearing against the downwardly facing shoulders 48 and 49 and its mid-portion bearing against the upper flat surface of collar 45, whereby the spring retains pin 44 in the position shown in Fig. 4 with the lower portion of collar 45 projecting into passageway 36 to prevent lateral movement of the bearing pad 31, or in a position rotated 90° from that shown in Fig. 4 wherein the collar 45 will clear the passageway 36 to permit removal of the bearing pad.

The ends of pin 44 are flush with the side surfaces of the bearing pad and two parallel opposed grooves are provided adjacent each end of the pin. As best seen in Fig. 3 each side surface of the bearing pad has formed therein a groove 52 surrounding said pin and extending laterally therefrom. A tool for installing and removing the bearing pad is shown in Figs. 7 and 8. Said tool has a cylindrical shank 53 and a T-shaped slot cut into the end thereof. In the use of the tool, it is placed endwise in the slot 52 adjacent the pin 44 and then moved laterally so that the T-slot engages grooves 51 in the pin. When the axis of the tool is in line with the axis of the pin, the tool is rotated 90° to rotate collar 45 out of passageway 36 and the bearing is then removed. It will be noted that the tool can only be removed from the pin 44 when the collar 45 is in a position to project into the passageway 36.

The bearing surface 42 is provided adjacent each of its front and rear ends with a slight depression 55. As best seen in Fig. 6, a plurality of passages 56 connect each of these depressions with the groove 47 in the rear surface of the bearing pad 31. Thus, the oil being delivered under pressure by passageway 36 enters groove 47 and passes through passages 56 to the depressions 55 to lubricate the bearing surface 42.

From the description given above, it can be seen that I have provided an engine having a plurality of bearing pads supporting the crankshaft of the engine, wherein the bearing pads may be individually removed and inspected or replaced without disturbing any of the other elements of the engine.

It will further be noted that since the main bearing surfaces of the crankshaft constitute the major diameter thereof, the crankshaft may be removed longitudinally of the engine by removing the bearing pads and replacing them with skids, without removing the engine from its mounting or any major disassembly of the engine.

While I have described herein the preferred embodiment of my invention, it is to be understood that various changes may be made in its construction by those skilled in the art without departing from the spirit of the invention as defined in the appended claims.

Having thus described my invention, what I claim and desire to secure by Letters Patent is:

1. In an internal combustion engine, a crankshaft having main bearing surfaces thereon, a plurality of crescent-shaped bearing pads for cooperation with each of said bearing surfaces, a bearing supporting web in said engine having a plurality of arcuate recesses for supporting said bearing pads, means for locking said bearing pads in said arcuate recesses comprising a cylindrical pin extending transversely of each bearing pad, an enlarged portion in each pin adapted to project beyond the rear surface of said bearing pad in one position of said pin and to be retracted within the outline of said bearing pad upon turning movement of said pin to a second position, and a groove in the surface of each of said arcuate recesses to receive said enlarged portion when extended and prevent lateral movement of said bearing pad relative to said arcuate recess.

2. In an internal combustion engine, a crankshaft having main bearing surfaces thereon, a plurality of crescent-shaped bearing pads for cooperation with each of said bearing surfaces, a bearing supporting web in said engine having a plurality of arcuate recesses for supporting said bearing pads, means for locking said bearing pads in said arcuate recesses comprising a cylindrical pin extending transversely of each bearing pad, an enlarged portion in each pin adapted to project beyond the rear surface of said bearing pad in one position of said pin and to be retracted within the outline of said bearing pad upon turning movement of said pin to a second position, a groove in the surface of each of said arcuate recesses to receive said enlarged portion when extended and prevent lateral movement of said bearing pad relative to said arcuate recess, and a leaf-type spring mounted in said bearing pad and cooperating with flats provided on said enlarged portion of said pin to retain said pin in either its first or second position.

3. In an internal combustion engine, a crankshaft having main bearing surfaces thereon, a plurality of crescent-shaped bearing pads for cooperation with each of said bearing surfaces, a bearing supporting web in said engine having a plurality of arcuate recesses for supporting said bearing pads, means for locking said bearing pads in said arcuate recesses comprising a cylindrical pin extending transversely of each bearing pad, an enlarged portion in each pin adapted to project beyond the rear surface of said bearing pad in one position of said pin and to be retracted within the outline of said bearing pad upon turning movement of said pin to a second position, a groove in the surface of each of said arcuate recesses to receive said enlarged portion when extended and prevent lateral movement of said bearing pad relative to said arcuate recess, a leaf-type spring mounted in said bearing pad and cooperating with flats provided on said enlarged portion of said pin to retain said pin in either its first or second position, and means for supplying oil under pressure to the bearing surface of said bearing pad adjacent each end thereof.

4. In an internal combustion engine, a crankshaft having main bearing surfaces thereon, the main bearing surfaces being the major diameter of said shaft, a plurality of removable crescent-shaped bearing pads engaging each of said main bearing surfaces, whereby when said bearing pads are removed said crankshaft may be removed longitudinally of the engine without removing the engine from its bed, a bearing supporting web in said engine having a plurality of arcuate recesses for supporting said bearing pads, means for locking said bearing pads in said arcuate recesses comprising a cylindrical pin extending transversely of each bearing pad, an enlarged portion on each pin adapted to project beyond the rear surface of said bearing pad in one position of said pin and to be retracted within the outline of said bearing pad upon turning movement of said pin to a second position, a groove in the enlarged surface of each of said arcuate recesses to receive said portion when extended and prevent lateral movement of said bearing pad relative to said arcuate recess.

5. In an internal combustion engine, a crankshaft having main bearing surfaces thereon, the main bearing surfaces being the major diameter of said shaft, a plurality of removable crescent-shaped bearing pads engaging each of said main bearing surfaces, whereby when said bearing pads are removed said crankshaft may be removed longitudinally of the engine without removing the engine from its bed, a bearing supporting web in said engine having a plurality of arcuate recesses for supporting said bearing pads, means for locking said bearing pads in said arcuate recesses comprising a cylindrical pin extending transversely of each bearing pad, an enlarged portion on each pin adapted to project beyond the rear surface of said bearing pad in one position of said pin and to be retracted within the outline of said bearing pad upon turning movement of said pin to a second position, a groove in the enlarged surface of each of said arcuate recesses to receive said portion when extended and prevent lateral movement of said bearing pad relative to said arcuate recess, a leaf-type spring mounted in said bearing pad and cooperating with flats provided on said enlarged portion of said pin to retain said pin in either its first or second position.

6. In an internal combustion engine, a crankshaft having main bearing surfaces thereon, the main bearing surfaces being the major diameter of said shaft, a plurality of removable crescent-shaped bearing pads engaging each of said main bearing surfaces, whereby when said bearing pads are removed said crankshaft may be removed longitudinally of the engine without removing the engine from its bed, a bearing supporting web in said engine having a plurality of arcuate recesses for supporting said bearing pads, means for locking said bearing pads in said arcuate recesses comprising a cylindrical pin extending transversely of each bearing pad, an enlarged portion on each pin adapted to project beyond the rear surface of said bearing pad in one position of said pin and to be retracted within the outline of said bearing pad upon turning movement of said pin to a second position, a groove in the enlarged surface of each of said arcuate recesses to receive said portion when extended and prevent lateral movement of said bearing pad relative to said arcuate recess, a leaf-type spring mounted in said bearing pad and cooperating with flats provided on said enlarged portion of said pin to retain said pin in either its first or second position, and means for supplying oil under pressure to the bearing surface of said bearing pad adjacent each end thereof.

References Cited in the file of this patent

UNITED STATES PATENTS 1,748,362    Noble _____ Feb. 25, 1930